United States Patent
Ziegler

(10) Patent No.: US 9,316,318 B2
(45) Date of Patent: Apr. 19, 2016

(54) SENSORIZED SEALING SYSTEM

(75) Inventor: Sebastian Ziegler, Utrecht (NL)

(73) Assignee: AKTIEBOLAGET SKF, Gothenburg (SE)

(*) Notice: Subject to any disclaimer, the term of this patent is extended or adjusted under 35 U.S.C. 154(b) by 393 days.

(21) Appl. No.: 14/005,370

(22) PCT Filed: Mar. 14, 2011

(86) PCT No.: PCT/EP2011/001252
§ 371 (c)(1),
(2), (4) Date: Nov. 4, 2013

(87) PCT Pub. No.: WO2012/122999
PCT Pub. Date: Sep. 20, 2012

(65) Prior Publication Data
US 2014/0049008 A1  Feb. 20, 2014

(51) Int. Cl.
*G01M 3/18* (2006.01)
*F16J 15/32* (2006.01)
*G01M 3/28* (2006.01)
*G01M 13/00* (2006.01)

(52) U.S. Cl.
CPC .......... *F16J 15/3296* (2013.01); *G01M 3/2869* (2013.01); *F16J 15/32* (2013.01); *G01M 3/183* (2013.01); *G01M 13/005* (2013.01)

(58) Field of Classification Search
CPC ..... G01M 3/18; G01M 3/183; G01M 3/2869; F16J 15/3296
See application file for complete search history.

(56) References Cited

U.S. PATENT DOCUMENTS

| 639,321 A | 12/1899 | Washburn |
| 4,633,976 A * | 1/1987 | Waki ................. F16J 15/162 184/6.4 |
| 5,147,015 A * | 9/1992 | Snuttjer ............. F16J 15/406 184/104.1 |
| 5,648,614 A | 7/1997 | Martsfeld et al. |
| 6,397,661 B1 * | 6/2002 | Grimes ................. G01K 7/38 324/207.13 |
| 6,677,859 B1 * | 1/2004 | Bensen ................. A61F 5/48 340/552 |
| 6,984,465 B2 * | 1/2006 | Canepa ................. F04B 39/04 137/312 |
| 7,429,127 B2 * | 9/2008 | Walker ................. G01K 7/32 374/109 |
| 8,521,451 B2 * | 8/2013 | Kong ................... G01N 11/10 702/130 |
| 2002/0153882 A1 | 10/2002 | Grimes et al. |

(Continued)

FOREIGN PATENT DOCUMENTS

DE  4033473 A1  4/1992
DE  10112397 A1  10/2002

(Continued)

OTHER PUBLICATIONS

Grimes et al. "Wireless Magnetoelastic Resonance Sensors: A Critical Review" Senors 2002, 2, 294-313.*

(Continued)

*Primary Examiner* — Peter Macchiarolo
*Assistant Examiner* — Nathaniel Kolb
(74) *Attorney, Agent, or Firm* — Bryan Peckjian; SKF USA Inc. Patent Dept.

(57) ABSTRACT

The present invention relates to a sealing system comprising a seal that retains a liquid in a space between two concentrically mounted and relatively rotatable components. According to the invention, the sealing system comprises at least one magneto-elastic resonance sensor for measuring at least one parameter of interest associated with the sealed liquid, based on a detected resonant frequency of the at least one sensor.

12 Claims, 2 Drawing Sheets

(56) References Cited

U.S. PATENT DOCUMENTS

| | | | |
|---|---|---|---|
| 2004/0048131 A1* | 3/2004 | Canepa | F04B 39/04 |
| | | | 429/492 |
| 2004/0232620 A1 | 11/2004 | Bock et al. | |
| 2006/0006601 A1 | 1/2006 | Hufnagel et al. | |
| 2006/0050765 A1* | 3/2006 | Walker | G01K 7/32 |
| | | | 374/109 |
| 2009/0121440 A1 | 5/2009 | Feistel et al. | |
| 2011/0166802 A1* | 7/2011 | Kong | G01N 11/10 |
| | | | 702/50 |

FOREIGN PATENT DOCUMENTS

| | | | | |
|---|---|---|---|---|
| DE | EP1621863 | A2 * | 2/2006 | ............ G01M 3/18 |
| DE | EP1965107 | A1 * | 9/2008 | ............ F16J 15/32 |
| EP | 1621863 | A2 | 2/2006 | |
| EP | 1965107 | A1 | 9/2008 | |
| WO | 0140756 | A2 | 6/2001 | |

OTHER PUBLICATIONS

Jain et al. "Magneto-acoustic sensors for measurement of liquid temeperature, viscosity and density" Applied Acoustics, 62, 2001, 1001-1011.*

Grimes C.A et al: "Remote query measurement of pressure, fluid-flow velocity, and humidity using magnetoelastic thickfilm sensor," Sensors and Actuators A, Elsevier Sequoia S.A., Lausanne CH, vol. 84, No. 3, Sep. 1, 2000.

* cited by examiner

SENSORIZED SEALING SYSTEM

FIELD OF THE INVENTION

The present invention relates to a sealing system comprising a seal that retains a liquid in a space between two concentrically mounted and relatively rotatable components. More specifically, the invention relates to such a sealing system that is provided with one or more sensors for measuring a parameter or parameters of interest associated with the sealed liquid.

BACKGROUND

One example of a sensorized sealing device is known from US 20060006601. The device disclosed herein comprises a seal with a radial sealing lip and further comprises a measuring probe that extends into a space to be sealed. The measuring probe is exposed to a medium to be sealed, and, in one embodiment, the probe is adapted to measure the age of the sealed medium. Thus, the sealed medium—typically a lubricating oil—can be replaced before oil condition has deteriorated to an unacceptable extent.

A further example of a sensorized sealing device is known from U.S. Pat. No. 5,648,614, which device incorporates an electrical sensor and a signal generator. In one embodiment the sensor is a Hall sensor, which is mounted at an air side of the sealing lip, for detecting moisture due to leakage. The detection of moisture is indicative of seal wear, meaning that the seal can be replaced before functionality is lost to an unacceptable degree.

Consequently, there are many applications where it is advantageous to provide a seal with one or more sensors. The use of different types of sensors, however, adds to the cost and complexity of manufacturing a sensorized seal unit and increases the demands placed on peripheral equipment for receiving and processing different sensor signals. There is thus room for improvement

SUMMARY OF THE INVENTION

It is an object of the present invention to define a sealing system provided with one or more sensors of the same kind, which can be readily adapted to measure or detect a variety of parameters associated with a sealed liquid.

The aforementioned object is achieved by means of a sealing system comprising one or more magneto-elastic resonance (MER) sensors.

An MER sensor comprises a magneto-elastic resonator, which typically comprises of a thin strip of amorphous ferromagnetic material, such as $Fe_{40}Ni_{38}Mo_4B_{18}$. When exposed to a time-varying magnetic field, the resonator is caused to vibrate at a resonant frequency that will change in response to a changing magnetic and mechanical state. Thus, by monitoring the resonant frequency at a constant magnetic state, a change can be attributed to a parameter of interest that influences the mechanical state.

The MER sensor may also comprise a resonator with two or more resonating elements, each with a unique length. The magneto-elastic (ME) resonating elements are commonly known as ribbons. The resonant frequency of each ribbon is inversely proportional to its length, meaning that each ribbon has a characteristic frequency that is distinguishable from another. The MER sensor may thus be adapted such that a change in the resonant frequency of each ribbon is attributable to a different parameter of interest.

The resonant frequency of an ME ribbon further depends on its elastic modulus, and density. An increase in mass, for example, has the effect of increasing density, which will cause a decrease in resonant frequency. Therefore, an ME ribbon may have a coating that is chemically responsive to the presence of a particular analyte. For example, to detect the presence of water in the sealed liquid, the ribbon may have a coating of TiO which adsorbs water. The frequency—mass-increase response of the ribbon is then used to quantify the amount of water in the sealed liquid. In a further example, an ME ribbon may have a polymer coating that expands in response to increasing temperature. This increases the elasticity of the ribbon, leading to a decrease in resonant frequency. The frequency—elasticity response of the ribbon can therefore be used to measure temperature.

In addition, (partial) immersion of a magneto-elastic ribbon in a liquid will cause a decrease in its resonant frequency compared with its resonant frequency in air. Therefore, leakage can be detected when an ME ribbon comes into contact with sealed liquid. The decrease is dependent on the degree of immersion and also on the dissipative shear force created by the liquid. The dissipative shear force depends on the viscosity of the liquid, and an ME ribbon can therefore be used to measure viscosity.

Furthermore, the elastic response of an ME ribbon is affected by temperature and by the strength of the applied magnetic field. The applied magnetic field can be selected such that the elastic response (and frequency response) of the ribbon is unaffected by temperature changes. Alternatively, the applied magnetic field strength can be selected such that the elastic response of the ME ribbon is highly temperature sensitive. The frequency—temperature response can then be used to measure temperature.

Other parameters can be measured based on the frequency response of an ME ribbon and, as mentioned, a magneto-elastic sensor in a sealing system according to the invention may comprise several ME ribbons. The frequency response of each individual ribbon may be correlated to a unique parameter of interest. Alternatively or additionally, the frequency response of two or more ribbons may by cross-correlated, particularly when the measured parameter is influenced by more than one factor.

To generate the time-varying magnetic field which causes an ME ribbon to vibrate, each ME sensor comprises excitation means; for example, a permanent magnet and an excitation coil. The mechanical vibrations which are induced in a ribbon generate, in turn, a time-varying magnetic flux. Each MER sensor therefore further comprises detection means, which may comprise a pickup coil for detecting the resulting magnetic flux signal. The resonant frequency of each of the one or more ribbons may be extracted from this signal. Suitably, the signal is processed in a processing unit such an oscilloscope, which is connected to the ME sensor.

In some applications, continuous monitoring of a particular parameter is desirable. The MER sensor is then operated in continuous mode, whereby the ME resonator is continuously resonated. In other applications, it is sufficient to monitor a parameter of interest at specific intervals; for example, once every hour. The MER sensor is then operated in intermittent mode, whereby the ME resonator is subjected to an excitation pulse that lasts for a few seconds In one example, the MER sensor comprises an excitation coil and a separate detection coil. The advantage of such a configuration is that resonant frequency can be monitored in the frequency domain. In a further example, the MER sensor comprises a single coil, which serves both as an excitation coil and as a detection coil. Thus, a more compact MER sensor is achieved. The sensor then comprises an electronic switch for connecting the coil between an excitation circuit and a detection circuit. The magnetic flux signal is measured in the time domain when the sensor comprises a single coil, and the detected signal is fast Fourier transformed to determine the resonant frequency of the one or more ME ribbons.

Other methods exist for determining the resonant frequency of the resonator. The induced mechanical vibrations also generate an acoustic wave that can be detected with a microphone in air or a hydrophone in liquid. Furthermore, a laser beam can be reflected from a surface of the resonator, and the response characterized by measuring changes in the returned beam intensity using e.g. a phototransistor. For reasons of simplicity, cost and measurement accuracy, detection of the time varying magnetic flux is the preferred method employed in each MER sensor that is used in a sealing system according to the invention.

A sealing system according to the invention typically comprises a radial lip seal, which encloses a gap between two relatively rotatable components, such as a shaft and the bore of a housing, and retains a liquid at an axially inner side of the seal.

In a first embodiment of the invention, the sealing system is provided with an MER sensor which serves as a leakage sensor. Suitably, the magneto-elastic resonator is arranged at an axially outer side of the seal at a location where an ME ribbon of the resonator will make contact with any liquid that leaks past the seal. As mentioned, an ME ribbon has a certain resonant frequency in air, which will change when the ribbon's effective density increases due to contact with liquid.

In a preferred example of the first embodiment, the sealing system comprises a collection trough arranged at the axially outer side of the seal. The collection trough is arranged at a position where any liquid that leaks past the seal lip falls due to gravity, and gathers at the bottom of the trough. The ME resonator is arranged in the collection trough such that at least a part of an ME ribbon will be immersed in leaked liquid that has fallen into the trough. A longitudinal edge or a transverse edge of the ribbon may be the part that is closest to the bottom of the trough, and which therefore becomes immersed first.

In a further development, the spacing between the relevant edge of the ME ribbon and the bottom of the trough is selected to correspond to an unacceptable amount of leakage. Thus, the processing unit can be adapted to issue a warning signal when a change in resonant frequency is detected, so that corrective maintenance may be carried out In a still further development, the relevant edge of the resonator is arranged directly above the bottom of the trough, so that the presence of any liquid leads to a change in resonant frequency. Again, the processing unit may be adapted to issue a warning signal when a change is detected. Alternatively, since the resonant frequency of the resonator will change continuously as the level of liquid in the trough rises, the processing unit may be adapted to monitor the resonant frequency and determine a rate of leakage. Thus, the processing unit may be adapted to issue a warning signal when the rate of leakage is dangerously high, and/or when a certain threshold value is reached.

In a further example of the first embodiment, the MER leakage sensor comprises a ribbon, which is arranged such that drops of leaked liquid fall onto a top surface area of the ribbon. A change in resonance frequency will occur each time a drop falls onto the ribbon, allowing the rate of leakage to be determined. Suitably, the MER leakage sensor is operated in continuous mode, so that each falling drop is detected.

In a second embodiment of the invention, the sealing system is provided with at least one MER sensor that is adapted to measure a property of the sealed liquid. The MER sensor is thus used as a condition monitoring sensor. Typically, the sealed liquid will be an oil for lubricating rotating machine parts such as gears and bearings, whereby the sensor measures one or more properties that affect the condition of the oil. The sealed liquid may also be hydraulic fluid, a coolant or any liquid that needs to be sealed within a system.

In this second embodiment, the magneto-elastic resonator is mounted at the axially inner side of the seal, at a location that will allow the one or more ME ribbons to be in contact with the sealed liquid. Preferably, the one or more ribbons are arranged so as to be fully immersed in the sealed liquid.

The excitation means and the detection means may be arranged at the axially inner side of the seal or at the axially outer side of the seal, depending on the design of the seal and the location of the resonator. In principle, the excitation and detection means can be separated from the magneto-elastic resonator by several centimeters, as long as the magnetic field is not prevented from reaching the resonator by e.g. a material with a low magnetic reluctance that diverts the magnetic flux. Many seals, however, comprise a metal casing to which an elastomeric sealing lip is bonded. The metal has a low reluctance. Therefore, when the resonator(s) are mounted at an inside surface of the metal casing, the excitation means and detection means are preferably also mounted at the inside surface of the metal casing. Any necessary cabling/wiring— e.g. for connecting the detection coil to the processing unit and/or for connecting the excitation coil to a power source— may be inserted through the metal casing or elastomeric sealing lip.

If the casing is made of a material with a high reluctance, then the excitation and detection means can be located at the air side of the seal It is also possible to locate the excitation and detection means at the air side of the seal when the magneto-elastic resonator(s) are mounted to the elastomeric sealing lip. The elastomeric material of the lip e.g. NBR rubber, does not block the magnetic field. Arranging the excitation and detection means at the air side has the advantage that penetration of the seal (for wiring/cabling) is unnecessary.

In one example of the second embodiment, the MER condition monitoring sensor has a resonator that is adapted to measure viscosity and temperature. Alternatively, the resonator may be adapted to measure viscosity and the seal may be provided with e.g. a thermocouple for measuring temperature. In a further example, the resonator comprises one or more ME ribbons provided with a coating that is chemically responsive to a particular contaminant, such as water or acidity.

Thus a sealing system according to the invention allows leakage and condition of the sealed liquid to be monitored in a straightforward manner. Other advantages of the present invention will become apparent from the detailed description and accompanying figures.

BRIEF DESCRIPTION OF THE DRAWINGS

The invention will be described in greater detail in the following, with reference to the embodiments that are shown in the attached drawings, in which.

DETAILED EMBODIMENTS

Figure 1:
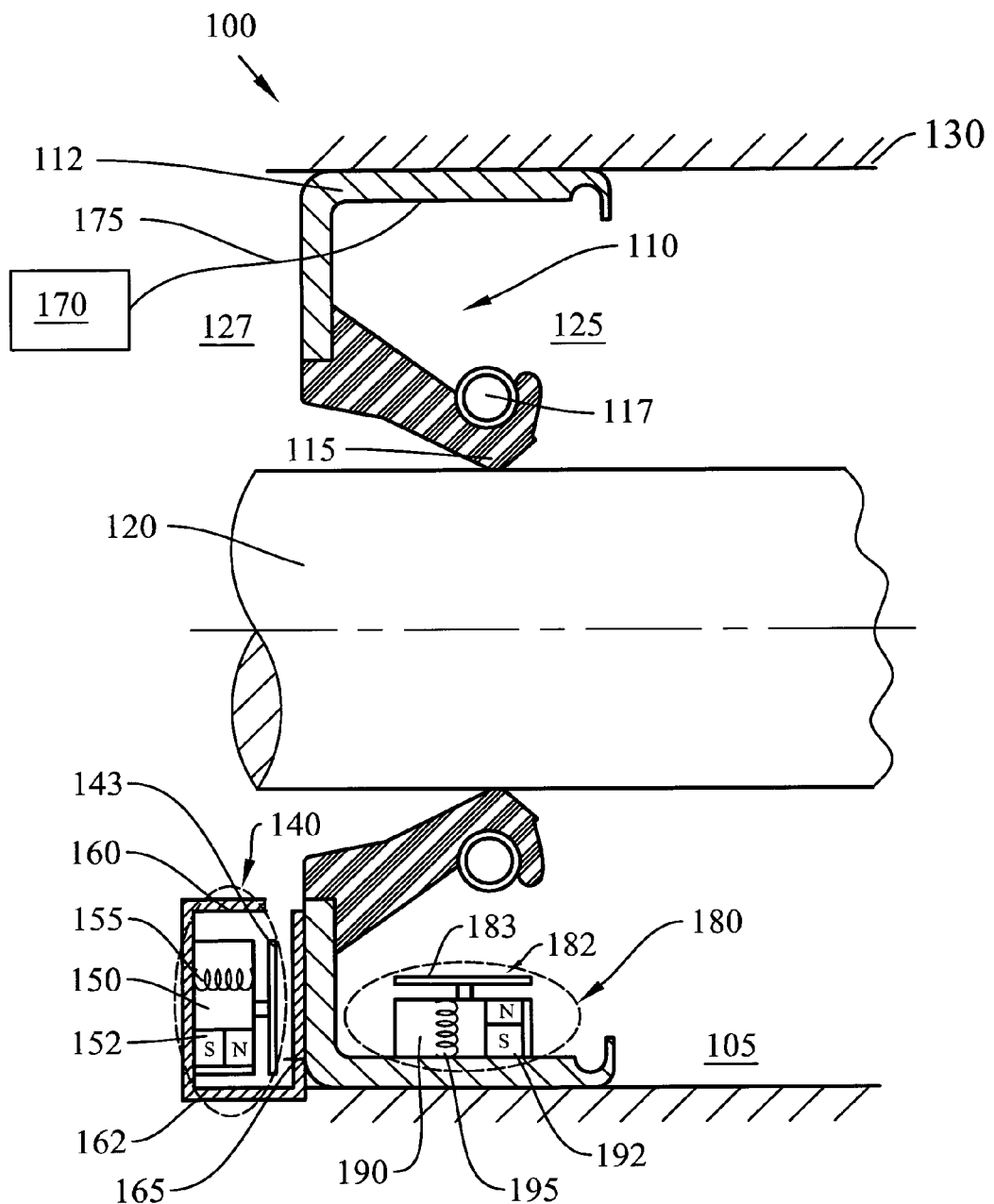
FIG. 1 shows a cross-sectional view of an example of a sealing system according to the invention, comprising an MER leakage sensor and an MER condition monitoring sensor.

An example of a sealing system according to the invention is shown in cross-section in FIG. 1. The system 100 comprises a radial lip seal 110, which encloses an annular gap between a shaft 120 and the bore of a housing 130, and which retains an oil lubricant 105 at an axially inner side 125 of the seal. The axially inner side of the seal will be defined as an oil side 125 of the seal and an axially outer side will be defined as an air side 127 of the seal. In this example, the housing 130 is a bell housing of a gearbox in a windmill and the shaft 120 is the gearbox input shaft. Typically, the gearbox houses bearings and gears which, in use, are splash-lubricated by the oil 105.

The seal 110 comprises a metal casing 112 to which an elastomeric sealing lip 115 is bonded. Suitably, an outer circumference of the casing 112 is mounted within the housing bore, and the lip 115 bears against a counterface on the shaft 120. The seal 110 in this example further comprises a garter spring 117, which urges the lip 115 against the counterface. The garter spring ensures that the lip and counterface remain in contact with each other, even if the shaft 120 exhibits dynamic eccentricity (shaft runout) and/or if the shaft and the housing bore are not perfectly coaxial.

During rotation of the shaft, the lip 115 is in sliding contact with the shaft. This causes wear, which mechanism is accelerated in the event of shaft runout and non-coaxiality as described above, since some sections of the lip 115 will be subject to a greater force than other sections. If the wear becomes excessive and contact is lost between the lip and the counterface, lubricant will leak from the oil side 125 of the seal to the air side 127. Sufficient lubrication is essential for the operation of the bearing and gears within the gearbox, and these components will fail if too much oil is lost and the bearings and gears continue to run in an unlubricated condition. Therefore, it is advantageous to be able to detect leakage, so that the seal can be replaced before component failure and damage occurs.

Figure 2A:
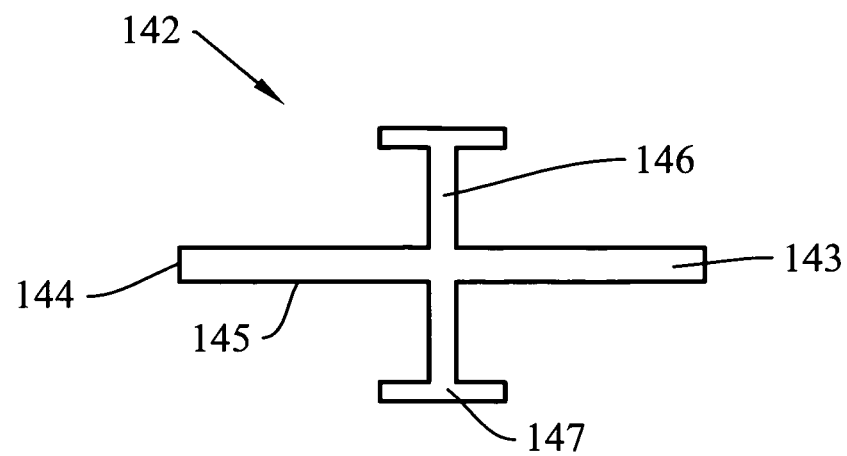
FIG. 2a is a top view of a magneto-elastic resonator used in the leakage sensor.

According to the invention, the sealing system is provided with a leakage sensor 140 which comprises a magneto-elastic resonance (MER) sensor. The MER leakage sensor comprises a magneto-elastic resonator, in the form of a thin strip an amorphous ferromagnetic material such as $Fe_{40}Ni_{38}Mo_4B_{18}$. A top view of the magneto-elastic resonator 142 is shown in FIG. 2*a*.

The resonator 142 has a ribbon-like resonating element, which will be referred to as a magneto-elastic (ME) ribbon 143. The ME ribbon 143 typically has a thickness of approximately 0.03 mm and may have a length in the region of 1-40 mm and a width w of between 0.1 and 5 mm. To enable mounting of the magneto-elastic resonator 142 to a component, the resonator comprises $1^{st}$ and $2^{nd}$ attachment parts 146, 147, which extend from a central portion of the ME ribbon 143.

When exposed to a time-varying magnetic field, the ME ribbon 143 is caused to vibrate at a resonant frequency. In air, the ME ribbon has a specific resonant frequency. If a part of the ME ribbon then comes into contact with leaked oil, the resonant frequency will change. Thus, leakage can be detected by monitoring the resonant frequency.

In the example of FIG. 1, the MER leakage sensor 140 comprises a sensor holder 150. The sensor holder comprises first and second clips for retaining the first and second attachment parts 146, 147 of the MER resonator 142, such that the ME ribbon 143 is free to vibrate. As mentioned above, the magneto-elastic material of the ribbon 143 vibrates in response to a time-varying magnetic field. Thus, the sensor holder also houses a permanent magnet 152, for generating a DC bias field, and an excitation coil 155, for generating an AC magnetic field.

Preferably, the strength of the bias field is selected such that the frequency response of the ME ribbon 143 is not affected by temperature changes.

The mechanical vibrations which are induced in the ME ribbon 143 by the excitation coil 155 generate, in turn, a time-varying magnetic flux, which can be detected by a pick-up coil. In some embodiments, the sensor holder 150 houses a second coil for detecting the resulting magnetic flux signal. In the example shown in FIG. 1, the excitation coil 155 also serves as the pick-up coil, and the sensor 140 further comprises an electronic switch for connecting between an excitation circuit and a detection circuit. The detection circuit is connected to a processing unit 170, where the resonant frequency of the ME ribbon is extracted from the detected magnetic flux signal. The connection to the processing unit may be wireless.

The MER leakage sensor 140 is arranged at the air side 127 of the seal 110. The sensor may be mounted directly to a part of the seal, at a location where the ME ribbon 143 will make contact with any oil that leaks past the radial lip 115. In a preferred embodiment the sealing system is provided with a trough 160, which is suitably positioned to collect leaked oil, and the MER leakage sensor 140 is arranged in the collection trough 160. This not only simplifies the mounting of the sensor, but ensures that the magneto-elastic resonator 142 comes into contact with leaked oil.

In the system of FIG. 1, the collection trough 160 is mounted at an axially outer side of the seal's metal casing 112. For example, when the shaft and the axially outer side of the seal are viewed from an axial direction, the trough is located at a "6 o-clock" position. In this position, any oil that leaks past the radial lip 115 will eventually drip down and gather at the trough bottom 162. The ME ribbon 143 of the MER leakage sensor 140 may be arranged such that a transverse edge 144 of the ribbon (refer FIG. 2*a*) is located just above the trough bottom 162, but not in contact therewith. In an alternative example, a longitudinal edge 145 of the ribbon may be positioned just above the trough bottom Thus, when only a small amount of oil has leaked into the trough 160, the transverse edge 144 (or longitudinal edge) of the ribbon will make contact with the oil and its resonant frequency will change.

An initial change in resonant frequency thus indicates that leakage has occurred. In some sealing systems, this may be sufficient warning to indicate that the seal needs to be replaced. In the sealing system shown in FIG. 1, a certain amount of leakage is permissible and the processing unit 170 is further configured to measure a rate of leakage. The maximum amount of leakage is indicated by the level marking on the collection trough designated with reference number 165. As the level of leaked oil rises, the resonant frequency of the ME ribbon 143 continues to change as more and more of the ribbon becomes immersed in the oil. Suitably, the resonant frequency is measured at regular intervals, e.g. once every 15 minutes, which provides an indication of the rate of leakage. If the seal has incurred serious damage, the rate of leakage will be high. The processing unit 170 is therefore further configured to issue a warning when a rate of change in the detected resonant frequency exceeds one or more predefined limits. For example, when a first predefined limit is exceeded, the warning signal may indicate that the seal must be replaced within one week. A second predefined limit may be set which is indicative of a catastrophic rate of leakage. When the second limit is reached or exceeded, the processing unit is suitably configured to trigger machine shutdown. As will be understood, various degrees of urgency can be attached to the warning signals issued by the processing unit.

Thus, a sealing system according to the invention that is provided with a MER leakage sensor enables the detection of leakage, measurement of an amount of leakage and measurement of a rate of leakage.

However, proper lubrication of rolling element bearings and gears is not merely a question of having sufficient lubricant. The oil must also have the ability to form a lubricant film of sufficient thickness, so as to separate the rolling contacts. Oil condition therefore plays an important role, particularly in high load applications. Accordingly, the sealing system shown in FIG. 1 is provided with a second MER sensor, which serves as an oil condition monitoring sensor 180.

Over time, exposure to atmospheric oxygen, mechanical loading and temperature will cause an oil to oxidise. Rapid oxidation can lead to the formation of long-chain, cross-linked polymers. For example, $C_{40}$ molecules may be formed, which can be approximately 1000 times heavier than the initial carbon molecule present in the oil. Increased viscosity is therefore a result of oil oxidation, and viscosity measurement provides an excellent indication of oil condition.

The condition monitoring sensor 180 therefore comprises a magneto-elastic resonator 182 that is configured for measuring viscosity. In addition, because viscosity is highly temperature dependent, the magneto-elastic resonator is further configured for measuring temperature. As explained with reference to the MER leakage sensor 140, the condition monitoring sensor 180 further comprises a sensor holder 190 with a permanent magnet 192 and an excitation/pickup coil 195. The condition monitoring sensor is mounted at the oil side 125 of the seal, suitably at a location that allows the magneto-elastic resonator 182 to be immersed in the oil 105.

Figure 2B:
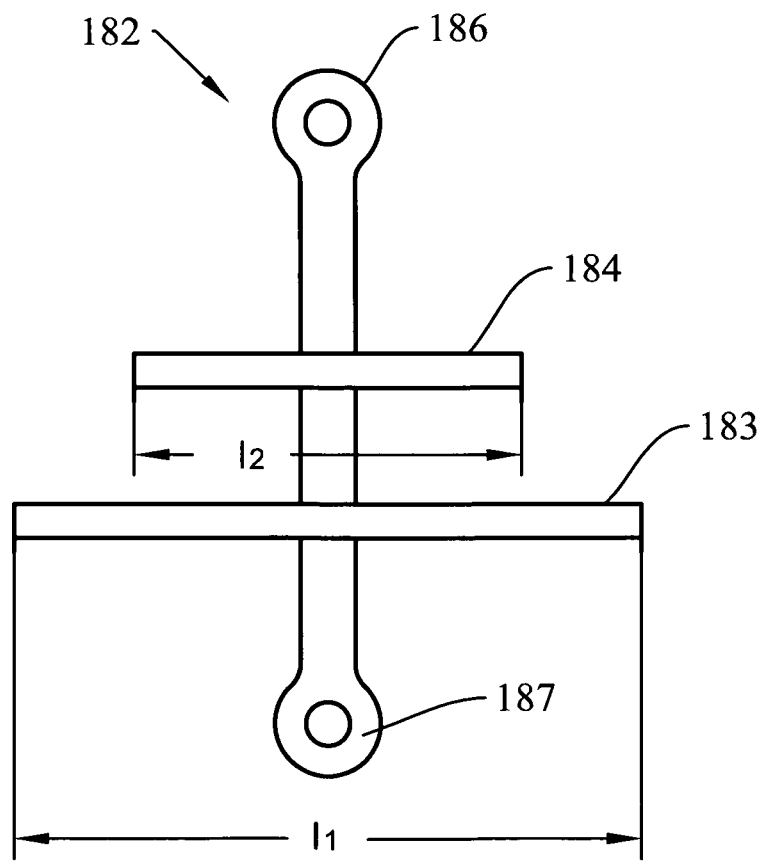
FIG. 2*b* is a top view of a magneto-elastic resonator used in the condition monitoring sensor.

An example of a suitable ME resonator 182 is shown, in a top view, in FIG. 2b. The resonator in this example comprises a first ME ribbon 183 of length $l_1$ and a second ME ribbon 184 of length $l_2$, which enable simultaneous measurement of viscosity and temperature. Because the resonant frequency of an ME ribbon is proportional to its length, each of the first and second ME ribbons has a characteristic resonant frequency that can be extracted from the magnetic flux signal detected by the pick-up coil 195. The ME resonator 182 further comprises first and second attachment parts 186, 187. In this example, the first and second attachment parts comprise holes or eyes, allowing the ME resonator 182 to be screwed to the sensor holder 190.

Preferably, the first ME ribbon 182 and the second ribbon 183 are located so as to be fully immersed in the oil 105, as this maximises the sensitivity of the frequency response to changes in viscosity. The first ME ribbon 183 comprises a strip of $Fe_{40}Ni_{38}Mo_4B_{18}$, which has a first resonant frequency when immersed in fresh oil at a specific temperature. The second ME ribbon 184 comprises $Fe_{74}B_{15}C_7Si_4$, which has a second resonant frequency when immersed in fresh oil at the same specific temperature. The first and second ribbons have essentially equal surface roughness and the difference between the first and second resonant frequencies remains the same at the specific temperature, regardless of whether the ribbons are both in air or are both in liquid. In other words, the difference is viscosity independent. The difference between the first and second resonant frequencies is, however, temperature dependent.

In this example, the DC bias field of the permanent magnet 192 is selected such that the frequency response of the first and second ME ribbons 183, 184 changes in response to changing temperature. The first ME ribbon has a first frequency-temperature response; the second ME ribbon, which comprises a different amorphous ferromagnetic material, has a second frequency-temperature response. At a temperature of e.g. 50° C., the difference between the first and second resonant frequency is e.g. 1 kHz. At a temperature of e.g. 70° C., the difference between the first and second resonant frequency is e.g. 2 kHz. Thus, a temperature measurement is obtained by comparing the resonant frequencies of the first and second ME ribbons 183, 184.

The viscosity measurement can be obtained from the first resonant frequency of the first ribbon 183 and/or from the second resonant frequency of the second ribbon 184. Suitably, the frequency response of one and/or both ribbons is calibrated prior to use, by measuring the resonant frequency in fresh oil at a range oil temperatures (corresponding to different viscosities). Then, as the oil oxidises during operational use and its viscosity at a measured temperature increases, the measured resonant frequency will differ from the calibration value. The difference (frequency shift) at a particular measured temperature can be correlated to a deteriorated oil condition.

The first and second resonant frequencies of the first and second ME ribbons 183, 184 are extracted from the magnetic flux signal detected by the coil 195. The excitation/pick-up coil 195 is connected to the processing unit 170 via a cable 175.

The cable may also provide electrical power to the condition monitoring sensor 180, or the sensor holder can further comprise a battery. The cable is led to the processing unit through an aperture in the metal casing 112, which aperture is preferably located above the shaft 120, to reduce the likelihood of oil loss via the aperture.

The magnetic flux signal undergoes Fast Fourier Transformation in the processing unit 170, from which the first resonant frequency and the second resonant frequency are determined. Temperature and viscosity are then determined as explained above. In the system 100 of FIG. 1, the condition monitoring sensor 180 is activated to measure viscosity and temperature at regular intervals (e.g. once every hour). Suitably, the processing unit 170 is programmed with a series of threshold values for measured viscosity, at a corresponding series of measured temperatures, which trigger a warning. The warning corresponds to an instruction that the oil in the system 100 should be replaced.

A further consequence of oil oxidation is the formation of organic acids. A condition monitoring sensor for use in a system according to the invention may therefore comprise a magneto-elastic ribbon with a pH-responsive coating, to detect increasing acidity of the oil. Lubrication performance is also adversely affected by contaminants such as water. The condition monitoring sensor may thus comprise an ME ribbon with a coating that swells in contact with water, or a coating that reacts in the presence of another analyte.

Thus, a sealing system according to the invention, comprising a magneto-elastic condition monitoring sensor, can readily be adapted to measure a wide variety of parameters associated with the sealed liquid.

A number of aspects/embodiments of the invention have been described. It is to be understood that each aspect/embodiment may be combined with any other aspect/embodiment. The invention may thus be varied within the scope of the accompanying patent claims.

REFERENCE NUMERALS

100 Sealing system
105 Oil
110 Radial lip seal
112 Metal casing
115 Elastomeric lip
117 Garter spring
120 Shaft
125 Oil side of seal
127 Shaft side of seal
130 Housing
140 MER leakage sensor
142 ME resonator of leakage sensor
143 ME ribbon (resonating element)
144 Transverse edge of ME ribbon
145 Longitudinal edge of ME ribbon
146 $1^{st}$ attachment part of ME resonator
147 $2^{nd}$ attachment part of ME resonator
150 Sensor holder
152 Magnet
155 Excitation coil/pickup coil
160 Collection trough
162 Trough bottom
165 Maximum level of leaked oil
170 Processing unit
175 Connection cable
180 MER condition monitoring sensor
182 ME resonator of condition monitoring sensor
183 First ME ribbon of resonator
184 Second ME ribbon of resonator
186 First attachment eye
187 Second attachment eye
190 Sensor holder
192 Magnet
195 Excitation/pickup coil
$l_1$ Length of $1^{st}$ ME ribbon in condition monitoring sensor
$l_2$ Length of $2^{nd}$ ME ribbon in condition monitoring sensor

The invention claimed is:

1. A sealing system comprising:
    a seal mounted in a gap between two concentrically mounted, relatively rotatable components, the seal retaining a liquid at an oil side of the seal;
    a sensor for sensing a parameter of interest associated with the liquid and for providing a sensor signal;
    a collection trough mounted at an air side of the seal, at a location where any leaked liquid will gather at a bottom of the trough, wherein the sensor is arranged in the trough; and
    processing means for processing the sensor signal and determining the parameter of interest, wherein,
    the sensor is a magneto-elastic resonance (MER) sensor, with
    a magneto-elastic resonator having a first resonating element which vibrates at a first resonant frequency in response to a time-varying magnetic field, wherein
    the resonator produces a sensor signal in the form of a time-varying magnetic flux signal, dependent on the first resonant frequency,
    the processing means is adapted to extract the first resonant frequency from the sensor signal and to determine the parameter of interest based on the first resonant frequency
    wherein the parameter of interest is leakage and the MER sensor is mounted at a location in the trough where at least the first resonating element will come into contact with any liquid that has leaked past the seal, such that a detected shift in the first resonant frequency is indicative of leakage, and
    an edge of the first resonating element is arranged below a level of maximum permitted leakage and the processing means is adapted to determine a rate of leakage from a detected rate of change in the first resonating frequency.

2. The sealing system according to claim 1, wherein the magneto-elastic resonator further comprises at least a second resonating element, which vibrates at a second resonant frequency, and the processing means is adapted to extract the second resonant frequency from the sensor signal and determine a further parameter of interest based on the second resonant frequency.

3. The sealing system according to claim 2, wherein the further parameter of interest is one of leakage, viscosity, temperature, pH-value or presence of a contaminant.

4. The sealing system according to claim 1, wherein an edge, of the first resonating element is arranged at a level above the trough bottom which corresponds to a maximum level of permitted leakage.

5. The sealing system according to claim 4, wherein the processing means is further adapted to issue a warning signal when the first resonant frequency reaches a predefined threshold corresponding to the maximum level of permitted leakage.

6. The sealing system according to claim 1, wherein the processing means is further adapted to issue a warning signal when the determined rate of leakage exceeds a predefined threshold.

7. The sealing system according to claim 1, further comprising a second ME resonator arranged at the oil side of the seal, such that the second ME resonator is immersed in the sealed liquid.

8. The sealing system according to claim 7, wherein the second ME resonator further comprises at least a second resonating element, which vibrates at a second resonant frequency, and the processing means is adapted to extract the second resonant frequency from the sensor signal and determine a further parameter of interest based on the second resonant frequency.

9. The sealing system according to claim 1, wherein the MER sensor comprises a sensor holder to which the ME resonator is attached.

10. The sealing system according to claim 9, wherein the sensor holder further comprises means for generating the time varying magnetic field and means for detecting the time-varying magnetic flux signal.

11. The sealing system according to claim 1, wherein the ME resonator comprises first and second attachment parts in the form of eyes.

12. The sealing system according to claim 1, further comprising one or more additional MER sensors.

* * * * *